United States Patent
Sanz Pascual et al.

(10) Patent No.: US 8,262,361 B2
(45) Date of Patent: Sep. 11, 2012

(54) WIND TURBINE MULTI-PANEL BLADE

(75) Inventors: Eneko Sanz Pascual, Zamudio (ES); Ion Arocena De la Rua, Zamudio (ES)

(73) Assignee: Gamesa Innovation & Technology, S.L., Pamplona (Navarra) (ES)

( * ) Notice: Subject to any disclaimer, the term of this patent is extended or adjusted under 35 U.S.C. 154(b) by 1206 days.

(21) Appl. No.: 12/072,227

(22) Filed: Feb. 25, 2008

(65) Prior Publication Data
US 2008/0206062 A1  Aug. 28, 2008

(30) Foreign Application Priority Data
Feb. 28, 2007  (ES) .................................. 200700527

(51) Int. Cl.
*F03D 1/00* (2006.01)
(52) U.S. Cl. ...................................................... 416/226
(58) Field of Classification Search .......... 416/2, 132 B, 416/223 R, 226, 248
See application file for complete search history.

(56) References Cited

U.S. PATENT DOCUMENTS

| 4,295,790 A * | 10/1981 | Eggert, Jr. ..................... 416/226 |
| 4,389,182 A | 6/1983 | Gersbeck |
| 4,643,646 A * | 2/1987 | Hahn et al. ..................... 416/226 |
| 4,732,542 A * | 3/1988 | Hahn et al. ..................... 416/226 |
| 7,153,090 B2 * | 12/2006 | DeLeonardo et al. ......... 415/4.2 |
| 7,179,059 B2 * | 2/2007 | Sorensen et al. ............... 416/226 |
| 2003/0138290 A1 * | 7/2003 | Wobben ......................... 403/293 |
| 2005/0214122 A1 * | 9/2005 | Sorensen et al. ............... 416/233 |
| 2010/0068065 A1 * | 3/2010 | Jensen ......................... 416/241 R |
| 2011/0171035 A1 * | 7/2011 | Esaki et al. ..................... 416/226 |
| 2011/0200444 A1 * | 8/2011 | Garcia ....................... 416/223 R |

FOREIGN PATENT DOCUMENTS

| DE | 31 09 566 A1 | 10/1982 |
| EP | 1 184 566 A1 | 3/2002 |
| EP | 1 584 817 A1 | 10/2005 |
| WO | 01/46582 A2 | 6/2001 |
| WO | 01/48378 A1 | 7/2001 |
| WO | 2006/103307 A2 | 10/2006 |

OTHER PUBLICATIONS espacenet English abstract of DE 31 09 566 A1, date: Oct. 1982.
espacenet English abstract of EP 1 244 873 A1 (corresponding to WO 01/48378 A1), date: Jul. 2001.

* cited by examiner

Primary Examiner — Edward Look
Assistant Examiner — Christopher R Legendre
(74) Attorney, Agent, or Firm — Ladas & Parry LLP

(57) ABSTRACT

A wind turbine blade comprising at least one central spar longitudinal section and at least two shell longitudinal sections forming, respectively, the leading edge and the trailing edge of the corresponding blade section. The central spar is composed of two cap prefabricated panels and two web prefabricated panels placed side by side in a box shape. The shell longitudinal sections are placed adjacently to the central spar section and are composed of a single prefabricated panel or of two prefabricated panels. The aerodynamic profile of the blade being defined by the cap panels and the single shell panels or two shell panels.

16 Claims, 2 Drawing Sheets

WIND TURBINE MULTI-PANEL BLADE

FIELD OF THE INVENTION

The present invention relates generally to wind turbine blades and particularly to multi-panel blades for facilitating its manufacture and transportation.

BACKGROUND

Wind turbines include a rotor that supports a number of blades extending radially therefrom for capturing the kinetic energy of the wind and causing a rotational motion of a driving train coupled to an electric generator for producing electrical power.

The amount of energy produced by wind turbines is dependent on the rotor blade sweeping surface that receives the action from the wind and consequently increasing the length of the blades leads normally to an increase of the power output of the wind turbine.

However, the size of the blades for land-based wind farms is presently limited to some extent by transportation and infrastructure requirements. In particular, the size of bridges and tunnels limit the size of the blade maximum chord.

To solve the transportation problems posed particularly by lengthy blades the prior art teaches the division of the blade in two or more longitudinal sections provided with joining means, so that each section may be manufactured individually and all sections may be assembled at the wind turbine site. Examples of this prior art are the following.

DE 3 109 566 discloses a wind turbine blade subdivided into at least two longitudinal sections which are held together by an expanding bolt.

U.S. Pat. No. 4,389,182 discloses a wind turbine blade subdivided into several longitudinal sections that are interconnected by tensioning members such as steel cables extending through the blade sections.

EP 1 244 873 A1 discloses a wind turbine blade subdivided into longitudinal sections that are joined by means of a butt joint comprising a number of clips arranged along the joint, having the respective ends fixed to the sections to be joined, and bolts for fixing said clips.

EP 1 584 817 A1 and WO 2006/103307, of the same applicant of the present invention, disclose a wind turbine blade subdivided into longitudinal sections having improved joining means.

There is also known prior art teaching the division of the blade in several transversal sections in addition or independently to the division in longitudinal sections. Examples of this prior art are the following.

EP 1 184 566 A1 discloses a wind turbine blade which is formed by assembling one, two or more longitudinal sections, each of which comprises a core formed by a longitudinal carbon-fiber tube on which a series of carbon fiber or fiberglass cross ribs are mounted and a cover formed by fiberglass or carbon-fiber joined to said ribs.

WO 01/46582 A2 discloses a wind turbine blade having a plurality of segmented elements attached to a load transmitting box spar and separated by elastic joints which enable the segments to move in relation to one another in order to minimise the tensile stress in the region of the blade in which the segments are located.

The current trend in the wind industry to big rotor blades demands new rotor blade designs suitable for complying with the transportation requirements and with the quality manufacturing requirements involved by blades that can reach lengths of 100 m and maximum chords of 8 m.

The present invention is intended to satisfy said demand.

SUMMARY OF THE INVENTION

An object of the present invention is to provide a wind turbine blade configuration allowing the assembly of big wind turbine blades at the site of its installation in a wind farm or in a facility close to the wind farm.

Another object of the present invention is to provide a wind turbine blade configuration that assembles all the blade panels through bolted joints, what results in a more reliable and lighter structure than the typical bonded structures of the wind turbine blades.

Another object of the present invention is to provide a wind turbine blade configuration allowing an optimized design.

Another object of the present invention is to provide a wind turbine blade easy to manufacture, handle and transport.

These and other objects of the present invention are met by providing a wind turbine blade comprising at least one central spar longitudinal section and at least two shell longitudinal sections, in which:

Each central spar section is composed of two cap prefabricated panels and two web prefabricated panels placed side by side in a box shape.

Said shell sections are placed adjacently to the central spar forming the leading edge and the trailing edge of the corresponding blade section.

Said shell sections being composed of one single prefabricated panel or two prefabricated panels in the pressure and suction sides.

The aerodynamic profile of the blade is defined by said cap panels and said shell panels.

Other features and advantages of the present invention will be understood from the following detailed description in relation with the enclosed drawings.

DETAILED DESCRIPTION OF PREFERRED EMBODIMENTS

This invention provides a multi-panel wind turbine blade structure for optimized quality and transportation. The invention involves splitting the whole blade into several parts for an assembly on site in order to achieve the following objectives.

A first objective is to allow the transport of big blades to the field and the assembly on site.

A second objective is to obtain a more reliable and lighter structure than the typical bonded structures of the wind turbine blades.

A third objective is to allow the selection of different materials and/or manufacturing processes and/or structural configurations for the different parts of the blade. As in any structure, the requirements for the different parts are very different: the central spar is the main load carrying path while the shells are the aerodynamic performance responsible parts but, structurally, less important. Within the central spar, the caps support higher loads than the webs. A multi-panel blade allows the use of different materials and/or manufacturing processes and/or structural configurations to each part according to its requirements involving an optimization of the blade cost.

A fourth objective is to improve the manufacturing process of the blades particularly in aspects such as quality control, productivity, and logistics.

In single-part blades the quality assurance is strongly conditioned by its size. In multi-panel blades the quality assurance and potential repairs, if needed, are easier and consequently the non-conformity costs can be reduced.

Additionally, the statistic quality control is also improved and a better manufacturing process evolution is possible.

The lead time and tack time of single-part blades manufacturing is high. These times are increasing with the increasing size. Multi-panel blades allow manufacturing the different parts in parallel and the final manufacturing stage of the blade becomes a purely assembly stage.

Multi-panel blades allow the blade manufacturer to organize the lay-outs according to different criteria and subcontract the manufacturing of some of these parts, if necessary.

Figure 1:
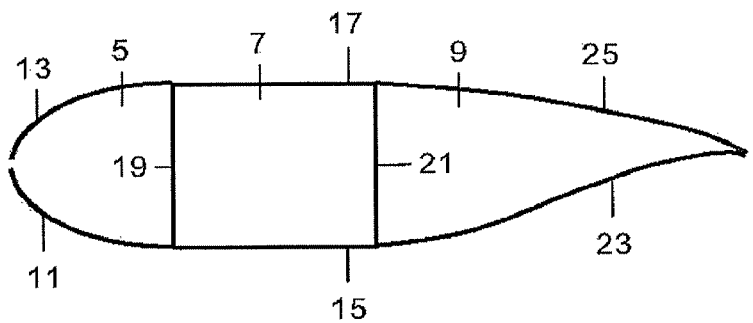
FIG. 1 is a schematic cross-sectional view of a wind turbine blade according to this invention.

As illustrated in FIG. 1, the blade according to this invention has an airfoil cross-section configured as a three cells section: a central spar 7, a leading edge shell 5 and a trailing edge shell 9 formed by one or several panels.

The leading edge shell 5 is formed by a leading edge pressure side panel 11 and a leading edge suction side panel 13.

The central spar 7 is formed by a front spar web panel 19, a spar cap pressure side panel 15, a spar cap suction side panel 17 and a rear spar web panel 21.

The trailing edge shell 9 is formed by a trailing edge pressure side panel 23 and a trailing edge suction side panel 25.

Figure 2:
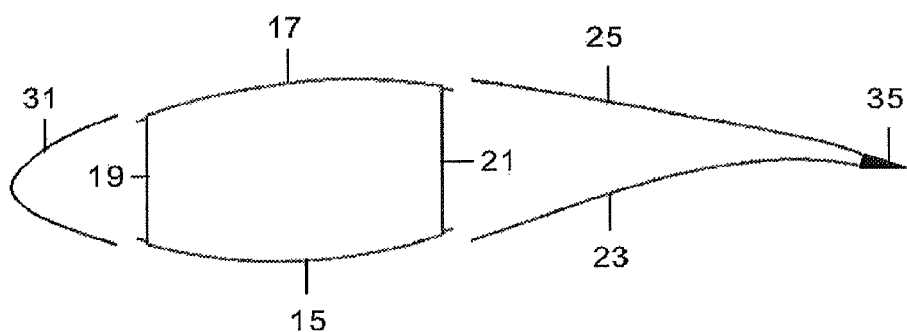
FIG. 2 is a cross-sectional view of a wind turbine blade according to this invention showing a first embodiment of the shells.

In a first embodiment of the shells according to this invention illustrated in FIG. 2, the leading edge shell 5 is formed by a single panel 31 and the trailing edge shell 9 is formed by two panels 23, 25.

Figure 3:
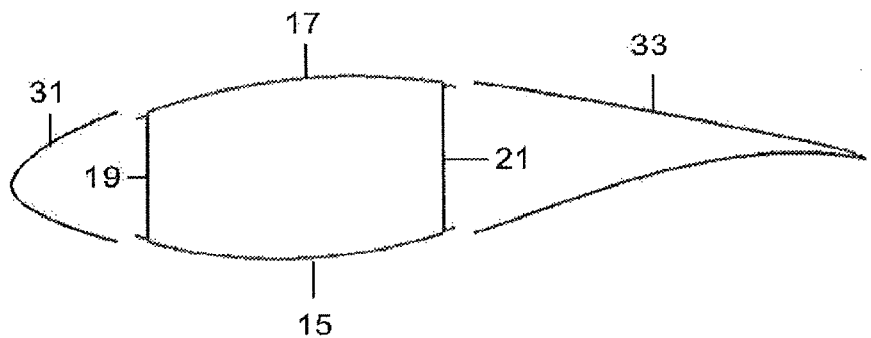
FIG. 3 is a cross-sectional view of a wind turbine blade according to this invention showing a second embodiment of the shells.

In a second embodiment of the shells according to this invention illustrated in FIG. 3, the leading edge shell 5 is formed by a single panel 31 and the trailing edge shell 9 is also formed by a single panel 33.

The blade may include an additional trailing edge tip part 35 (shown only in FIG. 2) for improving the aerodynamic performance of the very tip end and avoiding joints at the blade trailing edge.

Figure 4:
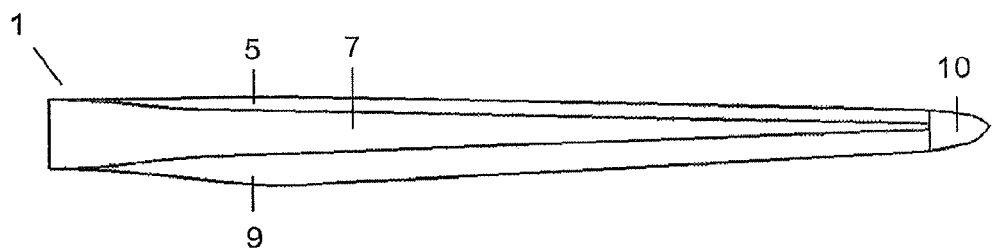
FIG. 4 is a plan view of a wind turbine blade according to this invention showing a first embodiment of the central spar and shells' longitudinal divisions.
Figure 5:
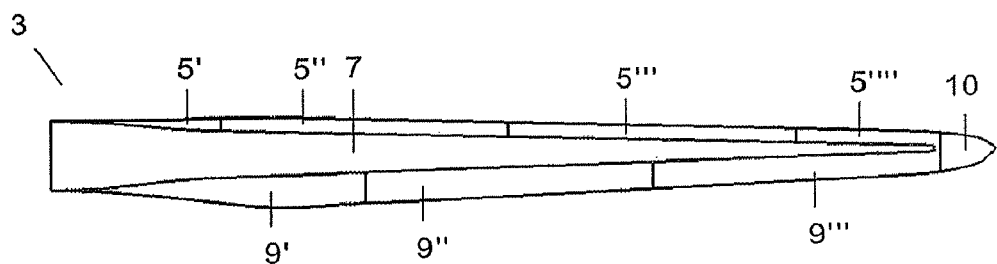
FIG. 5 is a plan view of a wind turbine blade according to this invention showing a second embodiment of the central spar and shells' longitudinal divisions.
Figure 6:
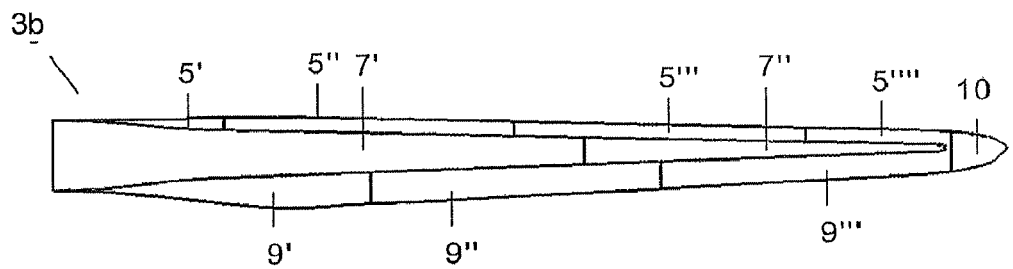
FIG. 6 is a plan view of a wind turbine blade according to this invention showing a third embodiment of the central spar and shells' longitudinal divisions.

As illustrated in FIGS. 4, 5, 6, the blade may comprise one or several central spar longitudinal sections 7, 7', 7", one or several leading edge shells' longitudinal sections 5, 5', 5", 5''', 5'''' and one or several trailing edge longitudinal sections 9, 9', 9", 9'''. The blade also comprise a tip section 10 which is manufactured as an extra part and assembled to the central spar and the shells.

Preferably the number of longitudinal shell sections is equal or greater than the number of longitudinal central spar sections.

In the embodiment shown in FIG. 4 the blade 1 comprises one central spar longitudinal section 7, one leading edge shell longitudinal section 5, one trailing edge shell longitudinal section 9 and a tip section 10.

In the embodiment shown in FIG. 6 the blade 3b comprises two central spar longitudinal sections 7', 7", four leading edge shell longitudinal sections 5', 5", 5''', 5'''', three trailing edge shell longitudinal sections 9', 9", 9''' and a tip section 10.

In the embodiment shown in FIG. 6 the blade 5 comprises two central spar longitudinal sections 7',7", four leading edge shell longitudinal sections 5', 5", 5''', 5'''', three trailing edge shell longitudinal sections 9', 9", 9''' and a tip section 10.

A relevant difference between this multi-panel configuration and the prior art multi-part blades is that the panels are placed adjacently and consequently the cap panels not only have structural functions but also have aerodynamic functions while the configuration of the prior art blades is based on an aerodynamic outer skin and internal load supporting caps and webs.

The blade is assembled joining all adjacent panels.

Mechanical means, chemical means or a combination of mechanical and chemical means may be used for the longitudinal joints between central spar sections. In particular the mechanical joining means disclosed in EP 1 584 817 A1 and WO 2006/103307, which are incorporated herein by reference, are suitable means for said joints.

Mechanical joints, such as bolted joints, may be used in longitudinal joints between longitudinal shells and in transversal joints between panels.

Chemical-mechanical joints, i.e. joints combining mechanical means, such as bolts, and chemical means such as bonding means, may also be used in longitudinal joints between longitudinal shells and in transversal joints between panels.

Figure 7:
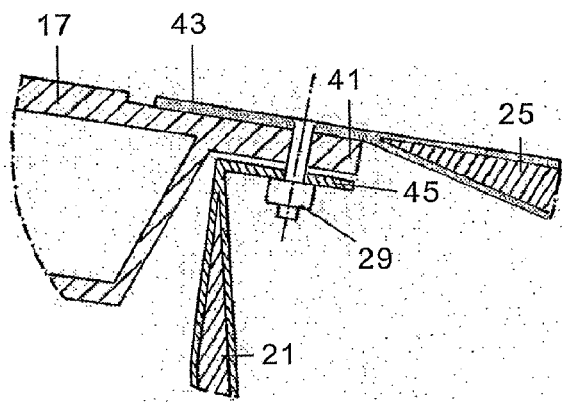
FIG. 7 is a cross-sectional view of a bolted joint between three panels of a wind turbine blade according to this invention.

While in the segmented blades known in the prior art the required joints only involve two blade components, the multi-panel configuration of the present invention may involve joints between three panels, i.e. the joint between a spar cap 17, a spar web 21 and a trailing edge panel 25 shown in FIG. 7.

In this case the joint is a bolted joint 29 between the three panels 17, 21, whose edges include planar extensions 41, 43, 45 parallel between them to allow such joint. As illustrated in FIG. 7 the planar extensions 41, 43 of the cap and trailing edge panels 17, 25 follow the profile of said panels and the planar extension 45 of the spar web panel 21 is configured as an angular extension of this panel.

In any case, the joints between panels shall maintain the required aerodynamic surface of the blade, using, if needed, sealing materials or fairings covering the edges of adjacent panels.

An important feature of the present invention is that the materials, structural configuration and manufacturing process of each type of panel and even of the same type of panel in different longitudinal sections of the blade may be different, allowing an optimization of the blade design and/or manufacturing.

In this respect, the main options are the following:
Structural configuration: Solid laminates and sandwich configurations.
Materials: Fiber Reinforced Plastics (in particular Carbon Fiber Reinforced Plastic and Glass Fiber Reinforced Plastic) combined with different core materials for sandwich configurations.

Manufacturing processes: Prepreg moulding/Resin Infusion/Wet lamination moulding and Autoclave/Vacuum assisted consolidation.

With respect to the above-mentioned embodiments of this invention, the main features of the different panels are the following:

Leading edge panels 11, 13, 31. Sandwich construction of glass fiber reinforced plastic (GFRP) with a foam core. The single leading edge curved panel 31 is manufactured in a female mould.

Spar caps panels 15, 17 in blades having two central spar longitudinal sections. Apart from a root section (non shown), the blade 5 comprises a first section 7' in which the spar cap panels 15, 17 consist of a first zone made as a sandwich of glass fiber prepreg with balsa wood core and a second zone made as a sandwich of glass fiber prepreg with glass or carbon fiber pultruded profiles as a core and a second section 7" in which the spar cap panels 15, 17 consist of a first zone made as a sandwich of carbon fiber prepreg with glass or carbon fiber pultruded profiles as a core, a second zone made as a sandwich of carbon fiber prepreg with balsa wood core and a third zone made as a solid laminate of carbon fiber prepreg. As it will be easily understood by the skilled man said structure is the result of a design process taking into account all relevant criteria and particularly the blade strength and blade stiffness requirements.

Spar web panels 19, 21. Sandwich construction with GFRP and a foam core.

Trailing edge panels 23, 25, 33. Sandwich construction of GFRP with a foam core.

Although the present invention has been fully described in connection with preferred embodiments, it is evident that modifications may be introduced within the scope thereof, not considering this as limited by these embodiments, but by the contents of the following claims.

The invention claimed is:

1. A wind turbine blade comprising at least one central spar longitudinal section (7) and at least two shell longitudinal sections (5, 9), wherein:
   a) each central spar section (7, 7', 7") is composed of only two cap prefabricated panels (15, 17) and two single-piece web prefabricated panels (19, 21) placed side by side in a box shape;
   b) each shell section (5, 5', 5", 5''', 5''''; 9, 9', 9", 9''') forming, respectively, a leading edge and a trailing edge of the corresponding blade section is placed adjacently to a central spar section (7, 7', 7");
   c) each shell section (5, 5', 5", 5''', 5''''; 9, 9', 9", 9''') is composed of at least a single prefabricated panel (31, 33);
   d) an aerodynamic surface of the blade is composed of just said cap panels (15, 17) and shell prefabricated panels (31; 33); and
   e) joints between panels are carried out by chemical and/or mechanical joints.

2. A wind turbine blade according to claim 1, wherein the shell sections (9, 9', 9", 9''') forming the trailing edge are composed of a first prefabricated panel (23) in a pressure side and a second prefabricated panel (25) in a suction side.

3. A wind turbine blade according to claim 1, wherein the shell sections (5, 5', 5", 5''', 5'''') forming the leading edge are composed of a first prefabricated panel (11) in a pressure side and a second prefabricated panel (13) in a suction side.

4. A wind turbine blade according to claim 1, wherein the trailing edge shell sections (9, 9', 9", 9''') also include an additional tip part (35).)

5. A wind turbine blade according to claim 1, wherein the blade also comprises a longitudinal tip section (10).

6. A wind turbine blade according to claim 1, wherein the number of said shell longitudinal sections (5, 5', 5", 5''', 5''''; 9, 9', 9", 9''') is equal or greater than the number of said central spar longitudinal sections (7, 7', 7").

7. A wind turbine blade according to claim 6, wherein the blade comprises one central spar longitudinal section (7) and two shell longitudinal sections (5, 9).

8. A wind turbine blade according to claim 6, wherein the blade comprises one central spar longitudinal section (7) and several shell longitudinal sections (5', 5", 5''', 5''''; 9', 9", 9''').

9. A wind turbine blade according to claim 6, wherein the blade comprises several central spar longitudinal sections (7', 7") and several shell longitudinal sections (5', 5", 5'''; 9', 9", 9''').

10. A wind turbine blade according to claim 9, wherein the cap panels (15, 17) of at least two central spar longitudinal sections (7', 7") have a different material and/or structural configuration.

11. A wind turbine blade according to claim 1, wherein the cap panels (15, 17), the web panels (19, 21), and the shell panels (11, 13; 25, 27; 31, 33) have joint areas having planar extensions (41, 43, 45) in edges of the joint areas, and said planar extensions (41, 43, 45) are parallel and overlapping.

12. A wind turbine blade according to claim 1, wherein all joints between panels are carried out by mechanical joints.

13. A wind turbine blade according to claim 1, wherein joints between the central spar panels (15, 17, 19, 21) are carried out by chemical joints and joints between shell panels (11, 13; 23, 25; 31; 33) and central spar panels (15, 17, 19, 21) are carried out by mechanical joints.

14. A wind turbine blade according to claim 1, wherein all joints between panels are carried out by a combination of chemical-mechanical joints.

15. A wind turbine blade according to claim 1, wherein the material of the cap panels (15, 17) includes one of the following:
   a Carbon Fiber Reinforced Plastic;
   a Glass Fiber Reinforced Plastic.

16. A wind turbine blade according to claim 1, wherein the structural configuration of the cap panels (15, 17) includes one of the following:
   a solid laminate;
   a sandwich configuration.

* * * * *